United States Patent [19]

Schaver, Jr.

[11] Patent Number: 5,505,001
[45] Date of Patent: Apr. 9, 1996

[54] SWITCH LEVEL

[76] Inventor: James Schaver, Jr., 5565 W. 95th St., Apt. 2, Oak Lawn, Ill. 60453

[21] Appl. No.: 362,017

[22] Filed: Dec. 22, 1994

[51] Int. Cl.⁶ .................................................. G01C 9/28
[52] U.S. Cl. ........................... 33/371; 33/354; 33/DIG. 10
[58] Field of Search ............................... 33/371, 354, 370, 33/DIG. 1, DIG. 10, 333, 528

[56] References Cited

U.S. PATENT DOCUMENTS

| | | | |
|---|---|---|---|
| 2,184,449 | 12/1939 | Bell | 33/333 |
| 2,483,029 | 9/1949 | Will | 33/371 |
| 3,123,918 | 3/1964 | Crabtree | 33/354 |
| 3,279,080 | 10/1966 | Stepshinski | 33/354 |
| 4,126,944 | 11/1978 | Burkhart | 33/371 |
| 4,208,802 | 6/1980 | Berndt | 33/371 |
| 4,793,069 | 12/1988 | McDowell | 33/528 |
| 5,063,679 | 11/1991 | Schwandt | 33/370 |

FOREIGN PATENT DOCUMENTS 544175  7/1957  Canada ..................................... 33/371

*Primary Examiner*—Christopher W. Fulton

[57] ABSTRACT

A tool for aiding in the leveling of electrical switches. This tool rests on the top portion of the rim around the toggle of single, and three and four-way switches that have a metal mounting bracket. This tool holds itself to the switch so that the user has use of both hands for adjusting and fastening purposes.

1 Claim, 1 Drawing Sheet

SWITCH LEVEL

BACKGROUND—FIELD OF INVENTION

This invention relates to the installation of switches, specifically to installing a switch level, leaving both hands free to adjust and fasten. When installing a switch it is necessary to look at the body of it to see if it is close to level, so it should be just as easy to look at the bubble of a level while adjusting the switch. Since the levelness of any installed object is often the only indication of a job well done, it becomes desireable to do so.

BACKGROUND —DESCRIPTION OF PRIOR ART

Many installers of electrical switches fail to install the switches level because of the clumsiness and time consuming process involved.

Heretofore two methods of leveling the switch have been proposed and implemented.

One such method requires visually sighting as close to level as possible. This method is only guesswork at best and can be influenced improperly by many surrounding factors.

The other method of leveling a switch involves holding a spirit level along side of the switch. This is clumsy and time consuming as the level gets in the way of fastening and adjusting the switch. This method tends to mar an already finished wall.

Most users, therefore, would find it desirable to easily level a switch without having to hold the level, or have it in the way.

OBJECTS AND ADVANTAGES

Accordingly I claim the following as my objects and advantages of my invention: to provide a tool that will quickly, easily, and precisely allow a switch to be leveled, to provide a tool that will free the users hands for the leveling task, to provide a tool that requires minimal skill to use, to provide a tool that is easily transported around the job sight, to provide a tool that can be constructed of many different materials so as to be cost effective to the user.

Readers will find further objects and advantages of the invention from a consideration of the ensuing description and accompanying drawings.

DRAWING FIGURES

Figure 1:
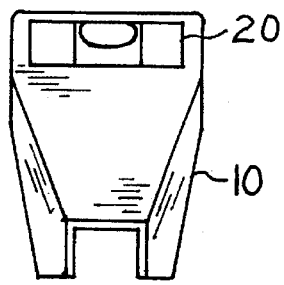
FIG. 1 shows the front of the level with the location of the bubble level.

List of Reference Numerals 10 body of the switch level
20 bubble level
30 magnet
40 toggle cut-out

DESCRIPTION OF INVENTION

Figure 2:
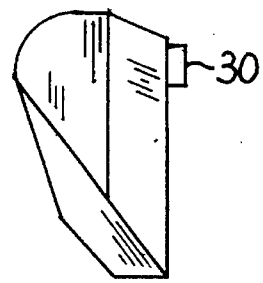
FIG. 2 shows a side view of the level and the location of the magnet base.
Figure 3:
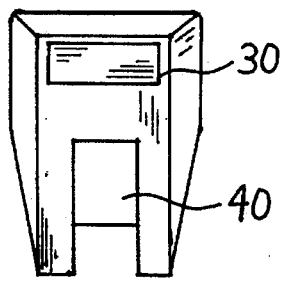
FIG. 3 shows the back of the leveling tool.
Figure 4:
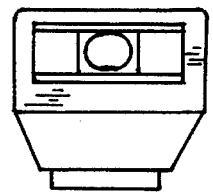
FIG. 4 shows the top view of the level.
Figure 5:
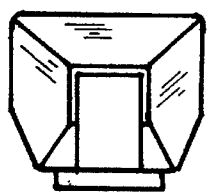
FIG. 5 shows the bottom view of the leveling tool.
Figure 6:
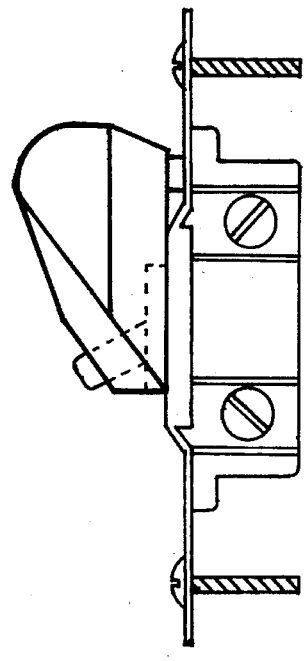
FIG. 6 shows the leveling tools' position and relationship when placed on a switch.

FIG. 1 shows the main body 10 of the switch level with the location of the bubble type level 20. FIG. 2 shows the side view of the tool with the location of the magnet 30 on the base. FIG. 3 shows the rear of the leveling tool. The tool is designed so that the bubble level 20 is parallel to the rectangular magnet on the base which is parallel to the top of the toggle cut-out notch.

Operation of the Switch Level

The tool is to be placed above the toggle of a switch (which is in the downward position) and which has been partially fastened, It is then slid down so that it sits flatly and parallel to the top of the protruding rim around the toggle. The hand can then be removed because the magnet is of sufficient strength to hold the plastic or nylon body of the tool in position. Now the switch can be adjusted and fastened while reading the level.

While the above description contains specificities, the reader should not construe these as limitations on the scope of the invention, but merely as exemplifications of preferred embodiments thereof. Those skilled in the art will envision other possible variations are within its scope, such as size, shape, and type of material used.

Accordingly, the scope of the invention should be determined not by the embodiments illustrated, but by the claims and their legal equivalents.

I claim:

1. A tool comprising, a body with bubble type leveling means horizontally disposed on the front portion, an attached magnet protruding from the upper rear portion of said body, a cutout on the lower rear portion of said body, the top of said cutout is parallel to said bubble level, the sides of said cutout are vertically disposed to the top of said cutout and vertically disposed to said bubble level, said cutout is to receive and rest on the rim portion of a standard wall switch toggle.

* * * * *